(12) United States Patent
Sakamoto

(10) Patent No.: US 8,436,273 B2
(45) Date of Patent: May 7, 2013

(54) MACHINING INFORMATION SUPPLY EQUIPMENT AND SUPPLY SYSTEM

(75) Inventor: Takeshi Sakamoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 382 days.

(21) Appl. No.: 12/669,230

(22) PCT Filed: Jul. 4, 2008

(86) PCT No.: PCT/JP2008/062208
§ 371 (c)(1),
(2), (4) Date: Feb. 17, 2010

(87) PCT Pub. No.: WO2009/011238
PCT Pub. Date: Jan. 22, 2009

(65) Prior Publication Data
US 2010/0258539 A1    Oct. 14, 2010

(30) Foreign Application Priority Data
Jul. 18, 2007  (JP) .................................. 2007-187292

(51) Int. Cl.
*B23K 26/04* (2006.01)
*B23K 26/42* (2006.01)
*G06F 19/00* (2011.01)

(52) U.S. Cl.
USPC .............. 219/121.6; 219/121.61; 219/121.62; 219/121.67; 700/121; 700/166

(58) Field of Classification Search ............... 219/121.6, 219/121.61, 121.62, 121.67; 700/121, 166
See application file for complete search history.

(56) References Cited

U.S. PATENT DOCUMENTS

| 4,546,231 A | 10/1985 | Gresser et al. |
| 5,932,119 A * | 8/1999 | Kaplan et al. ............ 219/121.68 |

(Continued)

FOREIGN PATENT DOCUMENTS

| CN | 1160228 A | 9/1997 |
| EP | 1 498 212 | 1/2005 |

(Continued)

OTHER PUBLICATIONS

U.S. Appl. No. 13/206,181, filed Aug. 9, 2011.

(Continued)

*Primary Examiner* — Evan Pert
(74) *Attorney, Agent, or Firm* — Drinker Biddle & Reath LLP

(57) ABSTRACT

A processing information supply apparatus 10 is prepared for a laser processing apparatus for forming a modified region, which becomes a starting point of cutting, along a line to cut within an object to be processed by irradiating the object with laser light while locating a light-converging point within the object. The processing information supply apparatus 10 includes an object information input unit 12 for inputting processing object information on the object to be processed, a processing condition database 19 in which data on processing conditions corresponding to the processing object information is accumulated, a processing condition setting unit 16 for referring to the processing condition data in the database 19 and setting the processing condition for the object based on the processing object information, and a condition information output unit 13 for outputting processing condition information for the set processing condition. Thus, the processing information supply apparatus and the supply system capable of favorably acquiring the processing information applied to the laser processing apparatus at a processing worker side are realized.

18 Claims, 14 Drawing Sheets

U.S. PATENT DOCUMENTS

| | | | |
|---|---|---|---|
| 6,875,950 B2 * | 4/2005 | Naumov et al. | 219/121.69 |
| 6,992,026 B2 | 1/2006 | Fukuyo et al. | |
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,848,552 B2 * | 12/2010 | Schutze et al. | 382/128 |
| 7,888,621 B2 * | 2/2011 | Abrott | 219/121.69 |
| 7,897,487 B2 * | 3/2011 | Sugiura et al. | 438/463 |
| 7,901,967 B2 * | 3/2011 | Komura et al. | 438/33 |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 2003/0003690 A1 * | 1/2003 | Nering et al. | 438/463 |
| 2005/0202596 A1 | 9/2005 | Fukuyo et al. | |
| 2005/0272223 A1 | 12/2005 | Fujii et al. | |
| 2006/0144828 A1 | 7/2006 | Fukumitsu et al. | |
| 2006/0148212 A1 | 7/2006 | Fukuyo et al. | |
| 2006/0255024 A1 | 11/2006 | Fukuyo et al. | |
| 2007/0085099 A1 | 4/2007 | Fukumitsu et al. | |
| 2007/0125757 A1 | 6/2007 | Fukuyo et al. | |
| 2007/0158314 A1 | 7/2007 | Fukumitsu et al. | |
| 2007/0252154 A1 | 11/2007 | Uchiyama et al. | |
| 2008/0006615 A1 * | 1/2008 | Rosario et al. | 219/121.68 |
| 2008/0017619 A1 * | 1/2008 | Yamakawa et al. | 219/121.81 |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0240368 A1 * | 9/2009 | Young et al. | 700/166 |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

FOREIGN PATENT DOCUMENTS

| | | |
|---|---|---|
| EP | 1 705 616 | 9/2006 |
| JP | 3408805 | 3/2003 |
| JP | 2004-009085 | 1/2004 |
| JP | 2004-020601 | 1/2004 |
| JP | 2005-34885 | 2/2005 |
| JP | 3708102 | 8/2005 |
| JP | 2006-43713 | 2/2006 |
| JP | 2006-095538 | 4/2006 |
| JP | 2006-323361 | 11/2006 |
| JP | 2007-030031 | 2/2007 |
| JP | 2007-75886 | 3/2007 |
| JP | 2007-095952 | 4/2007 |
| JP | 2007-098464 | 4/2007 |
| JP | 2007-118051 | 5/2007 |
| JP | 2007-175961 | 7/2007 |

OTHER PUBLICATIONS

U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.
X. Liu et al., "Laser Ablation and Micromachining with Ultrashort Laser Pulses," IEEE Journal of Quantum Electronics, vol. 33, No. 10, Oct. 1997, pp. 1706-1716.

* cited by examiner

Fig.2
(a)
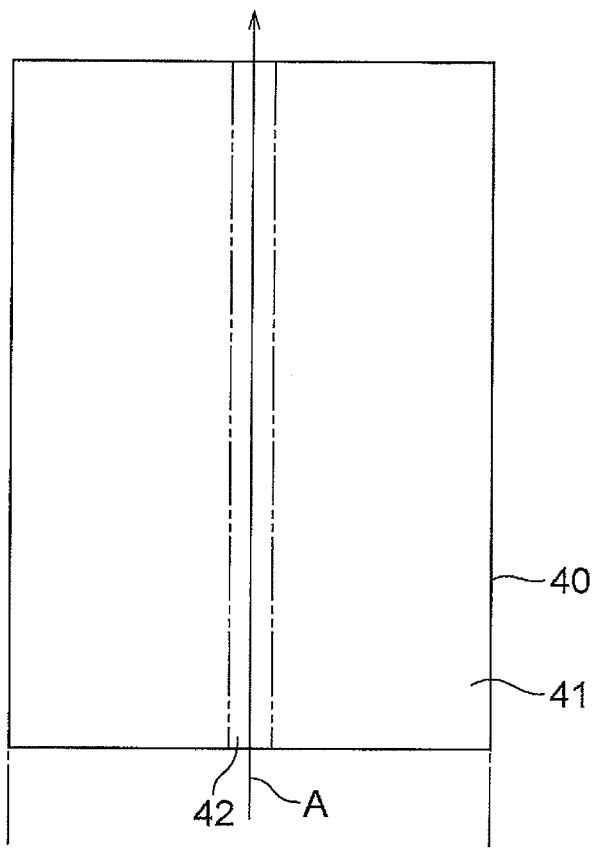
(b)
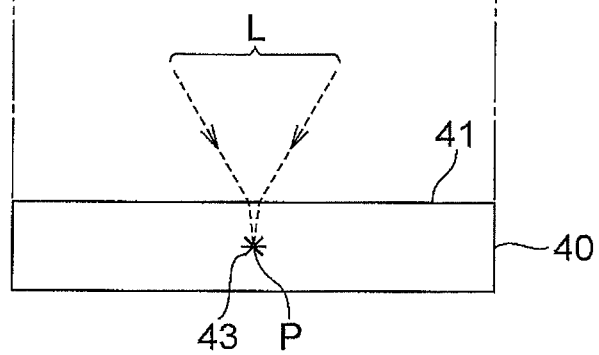

*Fig.3*
(a)
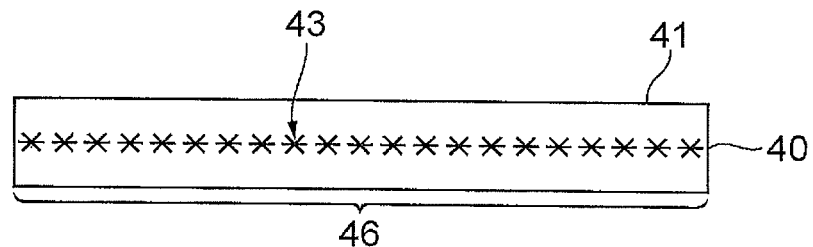
(b)
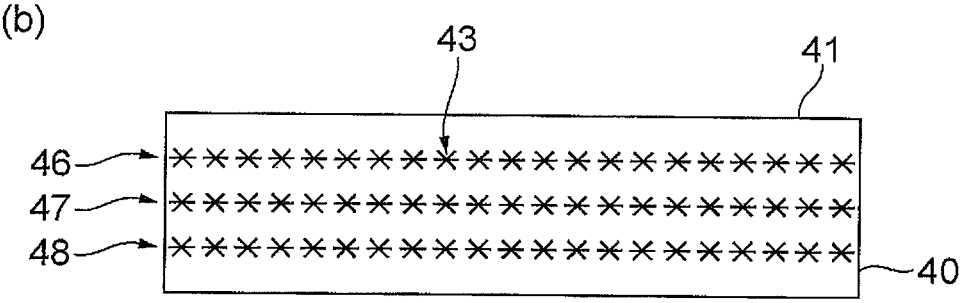

Fig.11

LASER PROCESSING APPARATUS PROCESSING INFORMATION SUPPLY TOOL — 50

PROCESSING OBJECT INFORMATION INPUT

PROCESSING WORK NAME [WORK 1] — 51

WAFER THICKNESS [230] μm — 52

INCIDENCE CONDITION  ○ REAR SURFACE INCIDENCE  ⊙ FRONT SURFACE INCIDENCE — 53

DETAILED INFORMATION  ○ NOT DESIGNATE  ⊙ DESIGNATE — 54

WAFER TYPE [ ▼]
WAFER SIZE [ ▼]
CHIP SIZE [ ] mm × [ ] mm
STREET WIDTH [ ] μm
CRYSTAL ORIENTATION/ PROCESSING ANGLE [ ▼] [ ]°
DOPE TYPE/RATE [Sb(n TYPE) ▼] [0.5] Ω·cm
STREET STATE [ ▼]
REAR SURFACE STATE [ ▼]

EXPANDING METHOD [ ▼] — 55

[SET PROCESSING CONDITION] — 56    [CLEAR] — 57

MACHINING INFORMATION SUPPLY EQUIPMENT AND SUPPLY SYSTEM

TECHNICAL FIELD

The present invention relates to a processing information supply apparatus for supplying processing information applied to a laser processing apparatus for cutting an object to be processed along a line to cut, and a processing information supply system using the apparatus.

BACKGROUND ART

Conventionally, a method for forming a modified region, which becomes a starting point of cutting, along a line to cut within an object to be processed by irradiating the object with laser light while locating a light-converging point within the object has been known as a method for carrying out a cutting process on the object to be processed such as a semiconductor wafer (for example, refer to Patent Documents 1 to 4). In the processing method, a cutting starting point region is formed by a modified region along a line to cut by irradiating an object to be processed with laser light while scanning a light-converging point with respect to the object. Then, a cutting process of the object is executed with the cutting starting point region used as a starting point.

Patent Document 1: Japanese Patent No. 3408805
Patent Document 2: Japanese Patent No. 3708102
Patent Document 3: Japanese Patent Application Laid-Open No. 2007-75886
Patent Document 4: Japanese Patent Application Laid-Open No. 2006-43713

DISCLOSURE OF THE INVENTION

Problems to be Solved by the Invention

As one example of laser processing apparatus using the above-described method, there is a processing apparatus for forming a modified region within an object to be processed by using laser light of a transmissive wavelength with respect to the wafer-shaped object. With such a configuration, the laser light of irradiating the object is transmitted through the object without giving any damage, however, a remarkably high laser light power density is locally obtained at the light-converging point within the object by the laser light being condensed. At this time, a modified region is formed within the object to be processed by an absorption phenomenon due to a high power density at the light-converging point within the object.

In such a processing method, conditions for forming a modified region necessary to cut an object and conditions for processing to form such a modified region greatly differ depending on the types and shapes of objects. In addition, it becomes necessary to accumulate processing knowledge on laser processing and processing data thereof in terms of setting processing conditions responsive to such an object. Therefore, in the above-described laser processing apparatus, there is a problem that it is difficult to appropriately set the processing conditions such as irradiation conditions of laser light to match individual objects at a processing worker side (at the user side of a laser processing apparatus) that actually is in charge of cutting process.

The present invention was developed in order to solve the above-described problem, and it is therefore an object of the invention to provide a processing information supply apparatus and a processing information supply system, which are capable of favorably acquiring processing information applied to a laser processing apparatus at a processing worker side.

Means for Solving the Problems

In order to achieve such an object, a processing information supply apparatus according to the present invention is an apparatus for supplying processing information applied to a laser processing apparatus for forming a modified region, which becomes a starting point of cutting, within an object to be processed along a line to cut the object by irradiating the object with laser light while locating a light-converging point within the object, and the processing information supply apparatus comprises (1) object information input means for inputting processing object information on the object to be processed, (2) a processing condition database in which data on processing conditions to form the modified region within the object to be processed by irradiating the object with the laser light, corresponding to the processing object information in the laser processing apparatus, is accumulated, (3) processing condition setting means for referring to the processing condition data included in the processing condition database and setting a processing condition for the object to be processed based on the processing object information input from the object information input means, and (4) condition information output means for outputting processing condition information for the processing condition set by the processing condition setting means.

In the processing information supply apparatus described above, a processing condition database is prepared by accumulating data of specific processing conditions in association with the processing object information, with respect to a cutting process of an object to be processed such as a semiconductor wafer using a laser processing apparatus, and a processing condition to be applied to the object is set by referring to the data in the processing condition database in the processing condition setting means. In this configuration, it is possible to preferably set the processing condition in the laser processing apparatus corresponding to the processing object information with respect to the type and shape of the object to be processed.

Further, for the processing condition setting means and the processing condition database, object information input means for inputting the processing object information used to set processing conditions and condition information output means for outputting the set processing condition information are provided. With such a configuration, by a processing worker accessing the processing information supply apparatus, it becomes possible to favorably acquire the processing information to be applied to the laser processing apparatus at the processing worker side.

Still further, a processing information supply system according to the present invention includes a processing information supply apparatus having the above described configuration, and a processing information acquiring apparatus that is connected to the processing information supply apparatus via a network and acquires the processing information to be applied to the laser processing apparatus, wherein the processing information acquiring apparatus provides the processing object information to the processing information supply apparatus via the object information input means, and in addition acquires the processing condition information via the condition information output means.

Thus, according to the configuration in which the processing information acquiring apparatus is connected to the processing information supply apparatus via a network such as the Internet, etc., a processing worker who is a user of the laser processing apparatus may access the processing information supply apparatus installed in a manufacturer, etc., which produces the laser processing apparatus, from the processing information acquiring apparatus via the network. Then, by inputting necessary processing object information to the processing information supply apparatus, it is possible to easily acquire information on processing conditions to be applied in laser processing.

Effect of the Invention

With the processing information supply apparatus and the supply system according to the present invention, a processing condition database is prepared by accumulating data of processing conditions in a laser processing apparatus in association with processing object information, processing conditions to be applied to an object to be processed are set by referring to the data of the processing condition database in processing condition setting means, and further object information input means for inputting the processing object information used to set the processing condition and condition information output means for outputting the set processing condition information are provided, whereby it becomes possible to favorably acquire processing information applied to a laser processing apparatus at a processing worker side.

BRIEF DESCRIPTION OF THE DRAWINGS

FIG. 2 is a schematic view showing a laser processing method for an object to be processed.

FIG. 3 is a schematic view showing a laser processing method for an object to be processed.

FIG. 11 is a view showing one example of an input screen used for inputting processing object information.

DESCRIPTION OF THE SYMBOLS

Figure 1:
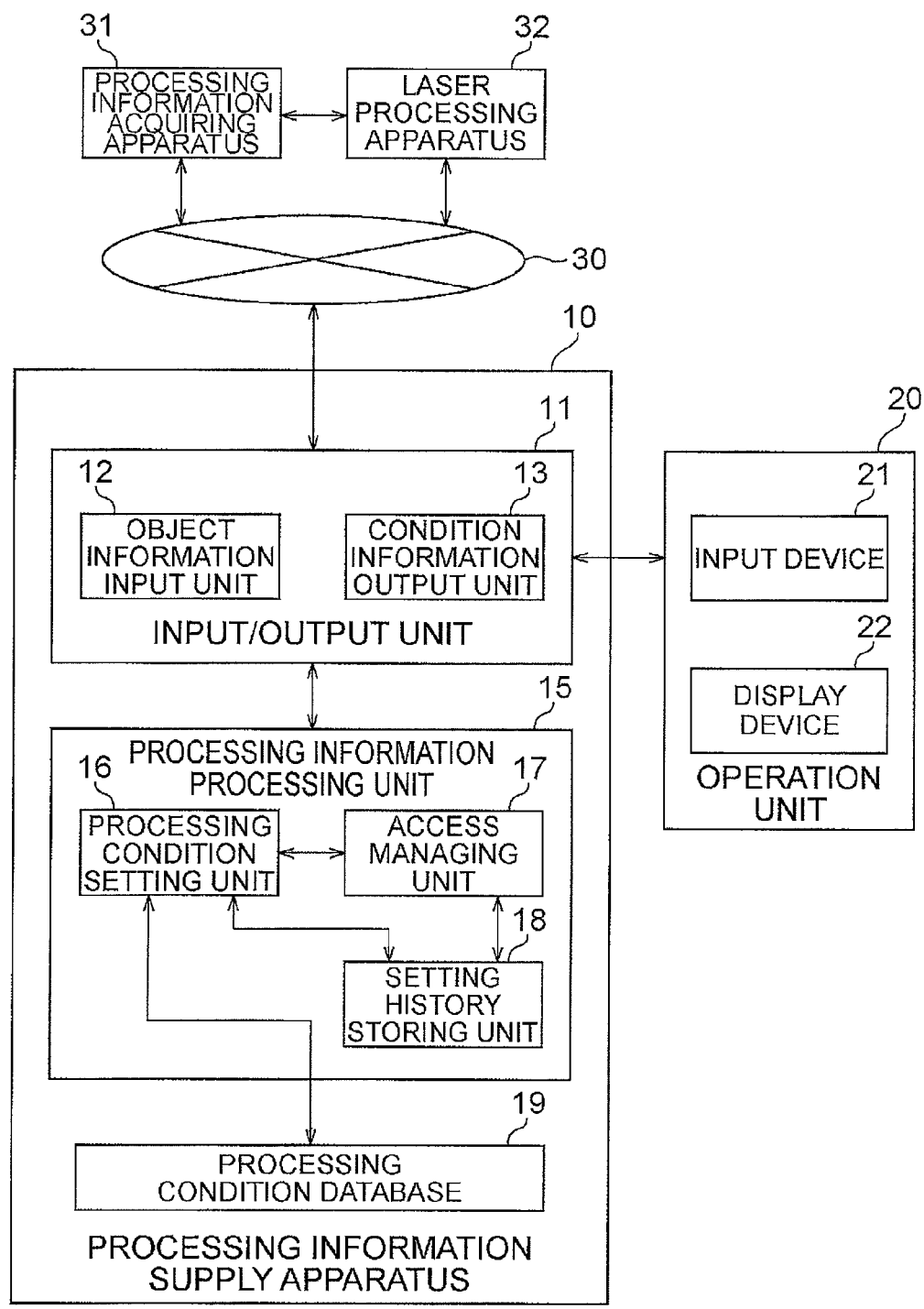
FIG. 1 is a block diagram schematically showing a configuration of one embodiment of a processing information supply system including a processing information supply apparatus.

10—Processing information supply apparatus, 11—Information input/output unit, 12—Object information input unit, 13—Condition information output unit, 15—Processing information processing unit, 16—Processing condition setting unit, 17—Access managing unit, 18—Setting history storing unit, 19—Processing condition database, 20—Operation unit, 21—Input device, 22—Display device, 30—Network, 31—Processing information acquiring apparatus, 32—Laser processing apparatus, 40—Object to be processed, 41—Surface, 42—Line to cut, 43—Modified region, 46-48—Cutting starting point region (Modified region row), L—Laser light, P—Light-converging point.

BEST MODES FOR CARRYING OUT THE INVENTION

Hereinafter, a detailed description is given of preferred embodiments of a processing information supply apparatus and a processing information supply system according to the present invention with reference to the accompanying drawings. Components that are identical to each other are given the same reference numerals in the description of the drawings, and overlapping description thereof is omitted. The dimensional ratios of the drawings are not necessarily coincident with those in the description.

FIG. 1 is a block diagram schematically showing a configuration of one embodiment of a processing information supply system including a processing information supply apparatus according to the present invention. A processing information supply apparatus 10 shown in FIG. 1 is a information supply apparatus for supplying processing information applied to a laser processing apparatus to a processing worker, etc., who is a user of the laser processing apparatus, in association with processing information for the laser processing apparatus for forming a modified region, which becomes a starting point of cutting, within an object to be processed along a line to cut the object by irradiating the object with laser light while locating a light-converging point within the object to be processed.

The processing information supply apparatus 10 according to the present embodiment includes an information input/output unit 11, a processing information processing unit 15, and a processing condition database 19. The input/output unit 11 includes an object information input unit 12 and a condition information output unit 13. The object information input unit 12 is input means for inputting processing object information on an object to be processed for cutting process of the object such as a semiconductor wafer by the laser processing apparatus. The condition information output unit 13 is output means for outputting processing condition information for a processing condition set by the processing information processing unit 15.

The processing information processing unit 15 includes a processing condition setting unit 16, an access managing unit 17, and a setting history storing unit 18. In addition, in the present supply apparatus 10, a processing condition database 19 is prepared for the processing information processing unit 15. The processing condition database 19 is a database in which data for processing conditions corresponding to the processing object information in the laser processing apparatus is accumulated.

In detail, in the processing condition database 19, for the laser processing apparatus as a target of information supply, data on processing conditions to form a modified region necessary for cutting process within the object to be processed by irradiating the object with laser light is stored in association with the processing object information such as types and shapes of objects. Such processing condition data is prepared, for example, based on processing knowledge, experience, and processing data, etc., accumulated by executing laser processing for various objects at a manufacturer's side who produces and provides a laser processing apparatus. Alternatively, the processing condition data may be prepared by collecting processing data, etc., acquired at a user side of the laser processing apparatus. Further, a description will be given later of detailed processing condition data.

In the processing information processing unit 15, the processing condition setting unit 16 is setting means for referring to the processing condition data stored in the above-described processing condition database 19 and for setting a processing condition for the object to be processed based on the processing object information input from the object information input unit 12. The processing condition set by the processing condition setting unit 16 is output outside as processing condition information via the condition information output unit 13, and is supplied to a user, etc., of the laser processing apparatus.

In addition, the setting history storing unit 18 is storing means for storing, as a setting history, the setting information in regard to setting of processing conditions executed based on the processing object information in the processing condition setting unit 16. In detail, the setting history storing unit 18 stores, as a setting history, the information including at least one of the processing object information and the processing condition information, as necessary. Such a setting history is stored and managed for setting processes repeatedly executed in the processing condition setting unit 16 in response to an information supply request from a processing worker per setting process or in the collected form thereof.

The above-described processing information supply apparatus 10 may be configured as a processing information supply server by including a CPU for executing various types of processes necessary to supply information such as setting processes in the processing condition setting unit 16, an input/output I/F functioning as the object information input unit 12 and the condition information output unit 13, a ROM in which respective software programs necessary for processing operations are stored, and one or a plurality of memory devices such as internal memories or external memory devices, which are used for the setting history storing unit 18 and the processing condition database 19.

Such processing information supply apparatus 10 is prepared by, for example, a manufacturer who produces a laser processing apparatus and accumulates the processing information thereof. In addition, the processing information supply apparatus (supply server) 10 shown in FIG. 1 is connectable to an external device via a network 30 such as the Internet.

Specifically, in the processing information supply apparatus 10, the input/output unit 11 including the object information input unit 12 and the condition information output unit 13 is configured so as to be connectable to a processing information acquiring apparatus 31, which acquires processing information applied to a laser processing apparatus, via the network 30. Thus, a processing information supply system provided with the processing information supply apparatus 10 and the processing information acquiring apparatus 31, which are connected to each other via the network 30, is configured.

The processing information acquiring apparatus 31 may be configured by, for example, an information acquiring terminal such as a personal computer connected to the Internet being the network 30. A user of the laser processing apparatus provides the processing object information for an object, for which a cutting process is attempted to be carried out by using the laser processing apparatus, to the information supply apparatus 10 via the object information input unit 12 by operating the information acquiring apparatus 31, and provides instruction for setting of the processing condition based on the processing object information.

Also, the user acquires the processing condition information showing the processing condition set by the processing condition setting unit 16 based on the previously instructed processing object information from the information supply apparatus 10 via the condition information output unit 13. At this time, as for a laser processing apparatus 32 that actually carries out cutting process on an object to be processed, the laser processing apparatus 32 is operated based on the processing condition information acquired by the processing information acquiring apparatus 31 automatically or manually by an operator, whereby a cutting process is executed on the object.

Further, the laser processing apparatus 32 may be configured so as to include a function of the processing information acquiring apparatus 31, and may be configured so that the laser processing apparatus 32 is connected directly to the processing information supply apparatus 10 via the network 30. In this case, for example, it is possible that setting of the processing conditions in the laser processing apparatus 32 is remotely operated directly by the processing information supply apparatus 10. In addition, in the configuration shown in FIG. 1, an operation unit 20 including an input device 21 and a display device 22 is connected to the input/output unit 11. If necessary, it is possible to acquire the processing information by the operation unit 20 provided for the processing information supply apparatus 10.

In association with the configuration in which the processing information acquiring apparatus 31 being an external device can be connected to the processing information supply apparatus 10 via the network 30 as described above, an access managing unit 17 is provided in the processing information processing unit 15. The access managing unit 17 is managing means for controlling accessing from the external processing information acquiring apparatus 31 to the processing information supply apparatus 10, and in addition for managing the accessing information.

A description is given of effects of the processing information supply apparatus according to the embodiment described above and the processing information supply system using the apparatus.

In the processing information supply apparatus 10 and the processing information supply system shown in FIG. 1, the processing condition database 19 is prepared by accumulating data of specific processing conditions in association with the processing object information with respect to cutting process of the object to be processed such as a semiconductor wafer using the laser processing apparatus 32, and the processing condition setting unit 16 sets the processing condition to be applied to the object by referring to the data in the processing condition database 19. In this configuration, it is possible to favorably set the processing condition in the laser processing apparatus 32 corresponding to the processing object information for types and shapes of the object.

Furthermore, for the processing condition setting unit 16 and the processing condition database 19, the input/output unit 11 including the object information input unit 12 for inputting the processing object information used to set the processing condition and the condition information output unit 13 for outputting the set processing condition information is provided. According to such a configuration, by a processing worker accessing the information supply apparatus 10, it is possible to preferably acquire the processing information to be applied to the laser processing apparatus 32 at the processing worker side.

Also, in the configuration shown in FIG. 1, by the object information input unit 12 and the condition information output unit 13 being connected to the processing information acquiring apparatus 31 via the network 30 such as the Internet in the processing information supply apparatus 10, the processing information supply system is configured. According to such a configuration, a processing worker who is a user of the laser processing apparatus 32 accesses the processing information supply apparatus 10 installed in a manufacturer, etc., of the laser processing apparatus via the network 30 from the processing information acquiring apparatus 31. Then, by inputting the necessary processing object information into the information supply apparatus 10, it is possible to easily acquire information of the processing condition to be applied to laser processing.

In addition, in the present embodiment, the processing information supply apparatus 10 is provided with the setting history storing unit 18 for storing the setting history including at least one of the processing object information and the processing condition information with respect to setting of the processing condition carried out in the processing condition setting unit 16. In this configuration, it is possible to easily recognize the state of utilization of the information supply apparatus 10 by a user of a laser processing apparatus at the processing information supply apparatus 10 side. Also, for example, if the processing object information input by the user is stored as the setting history, it becomes possible to recognize the content of the processing information necessary at the user side or the tendency thereof.

The processing information supply apparatus 10 and the supply system, which have such a configuration, are preferably applicable to supply of processing information for a laser processing apparatus for forming a modified region within an object to be processed by using laser light of a transmissive wavelength with respect to the wafer-shaped object. That is, in such a laser processing apparatus, a modified region that becomes a starting point of cutting process is formed within an object to be processed by using laser light of a transmissive wavelength. In such a processing apparatus, in order to accurately cut the object, processing conditions in cutting process for the object, which includes formation conditions of modified regions such as, for example, a size of the modified region, formed position of the modified regions in the thickness direction of the object, the number of the modified regions in the thickness direction, and the formation pitch of the modified regions along a line to cut, may greatly differ depending on the types and shapes of the object. On the other hand, by using the processing information supply apparatus 10 configured as described above, it becomes possible to reliably supply the information regarding the optimal processing conditions corresponding to individual objects to a processing worker.

Further, in the processing information supply apparatus 10 configured as described above, the processing condition setting unit 16 and the processing condition database 19 may be configured so that the processing condition setting program and a database are separately prepared, and the processing conditions are set while the program reads necessary data from the database. Alternatively, such a configuration may be acceptable in which the content of the database is contained in the processing condition setting program itself.

A further description is given of the processing information supply apparatus and the supply system according to the present invention along with specific configuration examples.

First, a description is given of a specific example of a laser processing apparatus that becomes a target to which information is supplied by the above-described processing information supply apparatus 10. In the laser processing apparatus described below, modified regions that become the starting points of cutting are formed within an object to be processed (refer to Patent Documents 1 to 4). In such a processing method, laser light of a transmissive wavelength is used for the object as described above as the laser light for cutting process. A brief description is given of such a laser processing method with reference to FIG. 2 to FIG. 4.

FIG. 2 is a schematic view showing a laser processing method of an object to be processed using laser light of a transmissive wavelength, (a) in FIG. 2 is a top view of the object, and (b) in FIG. 2 is a sectional view of the object at the plane perpendicular to the line to cut. As shown in FIG. 2($a$), a line to cut 42 to carry out cutting process for an object to be processed 40, for example a wafer-shaped (flat plate-shaped) object, is set on the surface 41 of the object 40. The line to cut 42 is a linearly extending virtual line.

In this laser processing method, as shown in FIG. 2($b$), by irradiating the object to be processed 40 with laser light L while locating a light-converging point P within the object 40, a modified region 43 that becomes a starting point of cutting is formed at the light-converging point P. Here, the light-converging point P is a point at which the laser light L is condensed. Further, the line to cut 42 may not be only a straight line but also a curved line, or may not be only a virtual line but also a line actually drawn on the object 40.

Then, the laser light L is relatively moved in the direction of the arrow A in FIG. 2($a$) along the line to cut 42, and the light-converging point P by the laser light L is scanned along the line to cut 42. Thereby, as shown in a sectional view along the line to cut 42 of (a) in FIG. 3, a plurality of modified regions 43 are formed within the object to be processed 40 along the line to cut 42, and the modified regions 43 become a cutting starting point region 46.

It is preferable that pulse laser light is used as the laser light L to form the modified regions 43. Alternatively, continuous laser light may be used. Further, the cutting starting point region 46 means a region that becomes a starting point of cutting (fracturing) when the object 40 is cut. There may be cases where the cutting starting point region 46 is formed by the modified regions 43 being continuously formed, or may be cases where the cutting starting point region 46 is formed as a modified region row in which the modified regions 43 are intermittently formed.

In such a laser processing method, the modified regions 43 are not formed by heating the object to be processed 40 by causing the object 40 to absorb the laser light L, but the laser light L is caused to transmit the object 40 using laser light of a transmissive wavelength, and the modified regions 43 are formed within the object 40. Accordingly, since almost no laser light L is absorbed on the surface 41 of the object 40, there is no case where the surface 41 of the object 40 is melted down (stealth dicing).

Figure 4:
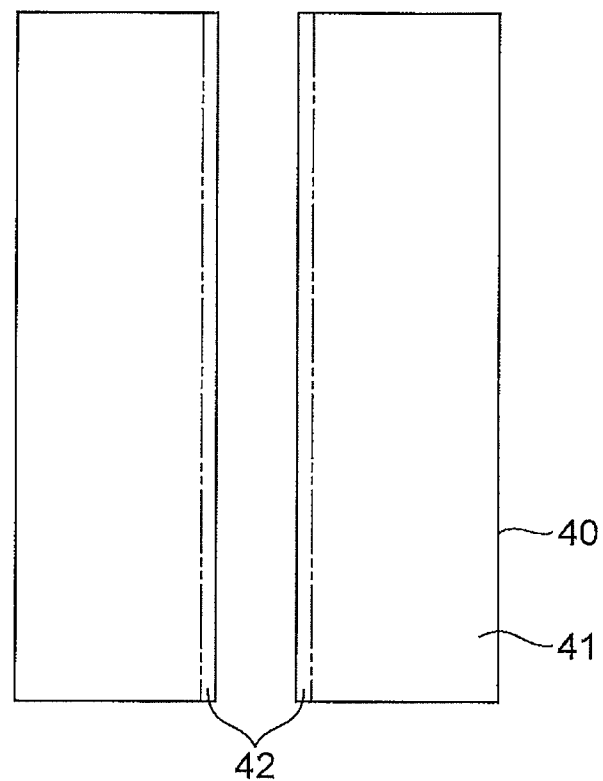
FIG. 4 is a schematic view showing a laser processing method for an object to be processed.

When the cutting starting point region 46 including the modified regions 43 is formed within the object to be processed 40, fractures readily occur with the region 46 used as the starting point. For this reason, as shown in FIG. 4, it is possible to cut the object 40 along the line to cut 42 with a relatively small force. Accordingly, it becomes possible to highly accurately cut the object 40 without generating unnecessary fractures on the surface 41 of the object 40.

As the method for cutting the object 40, for example, there is a method by which the object 40 fractures from the cutting starting point region 46 used as the starting point if an artificial force is applied to the object 40 after the cutting starting point region 46 is formed, and the object 40 is cut. Alternatively, there is a method by which, by forming the cutting starting point region 46, the object 40 fractures naturally in the sectional direction (thickness direction) of the object 40 with the cutting starting point region 46 used as the starting point, and the object 40 is cut as a result.

Also, with respect to the modified regions 43 formed within the object to be processed 40 by the above-described laser processing method, the following cases may be listed as specific examples, (1) where the modified region is a crack region containing one or a plurality of cracks, (2) where the modified region is a molten processed region, and (3) where the modified region is a refractive index change region.

Further, as for the cutting starting point region 46 by the modified regions 43, if the object 40 is relatively thin, it is sufficient that a single cutting starting point region 46 is formed as shown in (a) in FIG. 3. On the other hand, if the object 40 is thick, the number of scanning lines scanning the light-converging point P along the line to cut 42 for the object 40 may be two or more. In this case, as in the example, in which three cutting starting point regions 46, 47 and 48 are formed, for example, in (b) in FIG. 3, a plurality of cutting starting point regions are formed along the line to cut 42 within the object 40. Such a number of scanning lines is set preferably depending on the material of the object 40 and the thickness thereof.

Still further, for example, in the case where the object to be processed is a semiconductor wafer in which a plurality of functional elements are formed in the form of a matrix, and a plurality of semiconductor elements are brought about by cutting the semiconductor wafer in the form of a lattice per functional element, the lines to cut at the object may be set for both the X-axis direction and the Y-axis direction, which intersect one another. In this case, it is preferable that the cutting starting point regions for each of the X-axis direction and the Y-axis direction are formed in an appropriate order in several processing phases as necessary (refer to Patent Document 4).

Figure 5:
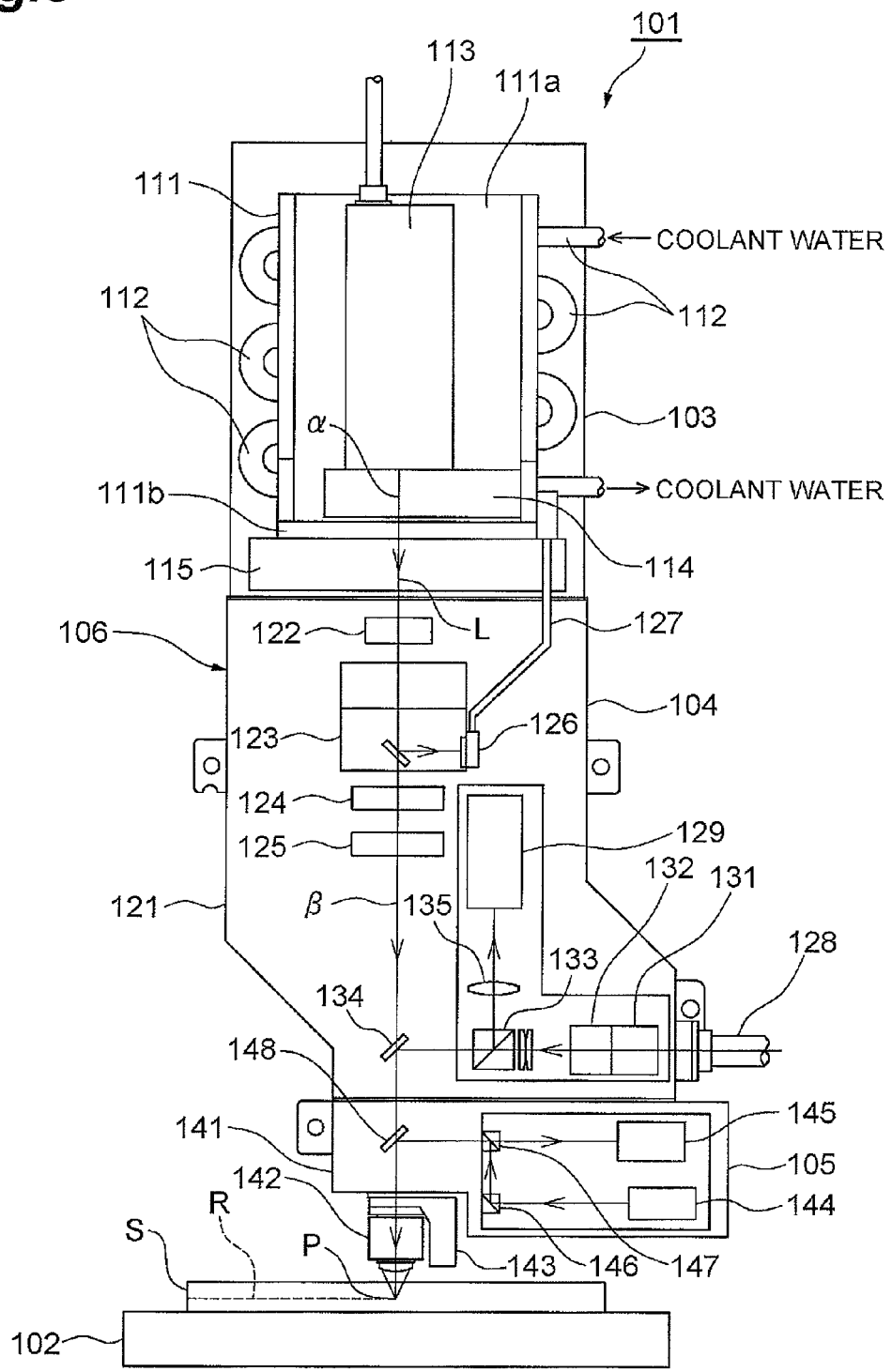
FIG. 5 is a configuration diagram briefly showing one example of a laser processing apparatus.

FIG. 5 is a configuration diagram briefly showing one example of a laser processing apparatus used for cutting process of an object to be processed (refer to Patent Document 2). The laser processing apparatus 101 according to the present configuration example is a processing apparatus for irradiating an object to be processed S with laser light L while locating the light-converging point P inside the flat plate-shaped object S placed on a stage 102 and for forming a modified region R within the object S. The stage 102 is configured so as to move in the vertical direction (the Z-axis direction) and the horizontal direction (the X-axis and Y-axis directions), and so as to rotatably move. In addition, a laser output device 106 consisting mainly of a laser head unit 103, an optical system main part 104, and an objective lens unit 105 is disposed upward of the stage 102.

The laser head unit 103 is detachably attached at the upper end part of the optical system main part 104. The laser head unit 103 has an L-shaped cooling jacket 111, and a cooling pipe 112 for circulating coolant water is buried in the vertical wall 111*a* of the cooling jacket 111 in a serpentine state. A laser head 113 for emitting laser light L downward and a shutter unit 114 for selectively opening and closing the optical path of the laser light L are attached to the front side of the vertical wall 111*a*. Here, the laser head 113 uses, for example, an Nd:YAG laser as the laser light source, and preferably emits pulse laser light, the pulse width of which is equal to or less than 1 μs, as the laser light L.

Further, in the laser head unit 103, an adjustment part 115 for adjusting the position and inclination of the cooling jacket 111 is attached to the lower face of the bottom wall 111*b* of the cooling jacket 111. The adjustment part 115 is to align the optical axis α of the laser light L emitted from the laser head 113 with the optical axis β of the optical system main part 104 and the objective lens unit 105. Also, through holes through which the laser light L passes are formed in the bottom wall 111*b* of the cooling jacket 111, the adjustment part 115, and the housing 121 of the optical system main part 104.

In addition, a beam expander 122 being a laser shaping optical system for expanding the beam size of the laser light L emitted from the laser head 113, an optical attenuator 123 for adjusting the output of the laser light L, an output observation optical system 124 for observing the output of the laser light L adjusted by the optical attenuator 123, and a polarization adjusting optical system 125 for adjusting the polarization of the laser light L are arranged on the optical axis β in the housing 121 of the optical system main part 104 in this order from up to down. Further, a beam damper 126 for absorbing eliminated laser light is attached to the optical attenuator 123, and the beam damper 126 is connected to the cooling jacket 111 via a heat pipe 127. Based on the above-described configuration, the laser light L emitted from the laser head 113 is adjusted to predetermined characteristics in the optical system main part 104.

Further, a light guide 128 for guiding visible light for observation is attached to the housing 121 of the optical system main part 104 in order to observe the object S placed on the stage 102, and a CCD camera 129 is disposed in the housing 121. The observation visible light is guided into the housing 121 by the light guide 128, and is reflected by a dichroic mirror 134 arranged on the optical axis β after the visible light successively passes through a field stop 131, a reticle 132, and a dichroic mirror 133, etc. The reflected observation visible light goes downward on the optical axis β, and the object S is irradiated with the visible light. Here, the laser light L is transmitted through the dichroic mirror 134.

The reflected light of the observation visible light, which is reflected from the surface of the object S, goes upward on the optical axis β and is reflected by the dichroic mirror 134. The reflected light reflected by the dichroic mirror 134 is further reflected by the dichroic mirror 133, passes through an imaging lens 135, etc., and is made incident into the CCD camera 129. An image of the object S, which is picked up by the CCD camera 129, is displayed on a monitor. Thus, an object observation optical system is composed of the light guide 128, the CCD camera 129, the field stop 131, the reticle 132, the dichroic mirrors 133, 134, and the imaging lens 135.

The objective lens unit 105 is detachably positioned and attached to the lower end part of the optical system main part 104. In addition, an actuator 143 using a piezoelectric element intervenes at the lower end of a housing 141 of the objective lens unit 105, and the processing objective lens 142 is mounted with the optical axis aligned with the optical axis β. Further, through holes through which the laser light L passes are formed in the housing 121 of the optical system main part 104, and the housing 141 of the objective lens unit 105. The peak power density of the laser light L condensed by the objective lens 142 at the light-converging point P is, for example, $1 \times 10^8$ (W/cm$^2$) or more.

In addition, a laser diode 144 for emitting measurement laser light and a light receiving part 145 are arranged in the housing 141 of the objective lens unit 105 in order to set the light-converging point P for the object to be processed S at a predetermined position. The measurement laser light is emitted from the laser diode 144, is reflected by a mirror 146 and a half mirror 147 in order, and thereafter is reflected by a dichroic mirror 148 disposed on the optical axis β. The reflected measurement laser light goes downward on the optical axis β, passes through the objective lens 142, and the object S is irradiated with the laser light. Here, the laser light L is transmitted through the dichroic mirror 148.

Then, the reflected light of the measurement laser light, which is reflected from the surface of the object S, is again made incident into the objective lens 142 and goes upward on the optical axis β, and then is reflected by the dichroic mirror 148. The reflected light of the measurement laser light, which is reflected by the dichroic mirror 148, passes through the half mirror 147 and is made incident into the light receiving part 145, and is converged on a four-divided position detection element composed by dividing a photodiode into four equal parts. Then, based on a converged image pattern of the reflected light of the measurement laser light condensed on the four-divided position detection element, it is possible to detect at which position the light-converging point of the measurement laser light by the objective lens 142 is located with respect to the object S.

With respect to the configuration of a laser processing apparatus that becomes a target to which the processing information supply apparatus 10 shown in FIG. 1 supplies processing information, FIG. 5 shows only one example, that is, in detail, the target may cover laser processing apparatus of various types of configurations. For example, FIG. 6 is a configuration diagram showing a modified example of the laser processing apparatus shown in FIG. 5.

Figure 6:
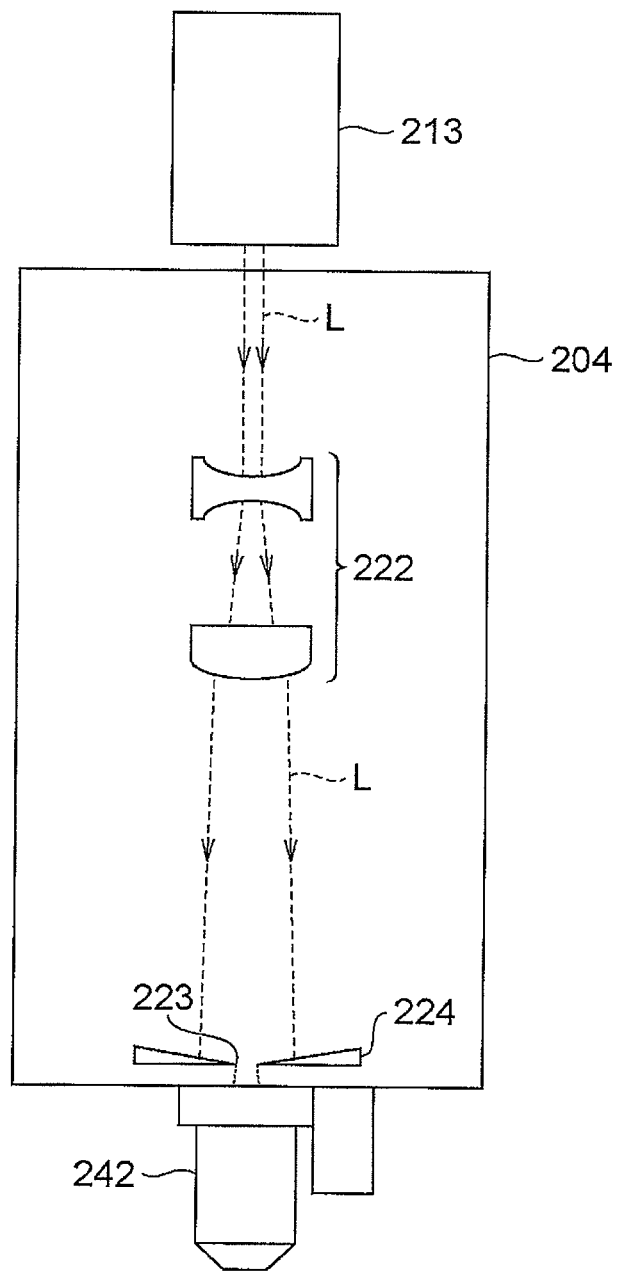
FIG. 6 is a configuration diagram showing a modified example of the laser processing apparatus.

In the configuration example shown in FIG. 6, a pair of knife edges 224 are installed in addition to a laser shaping optical system 222 for expanding the beam diameter of the laser light L in an optical system 204 provided between a laser head 213 and a processing objective lens 242. The knife edges 224 form a slit 223 which is positioned on the optical axis of the laser light L expanded by the laser shaping optical system 222 and extends in the direction parallel to the line to cut (refer to FIG. 2) at the object S. By changing the width of the slit 223 using such knife edges 224, the beam width of the laser light for irradiating the object to be processed S can be adjusted (refer to Patent Document) 3).

Figure 7:
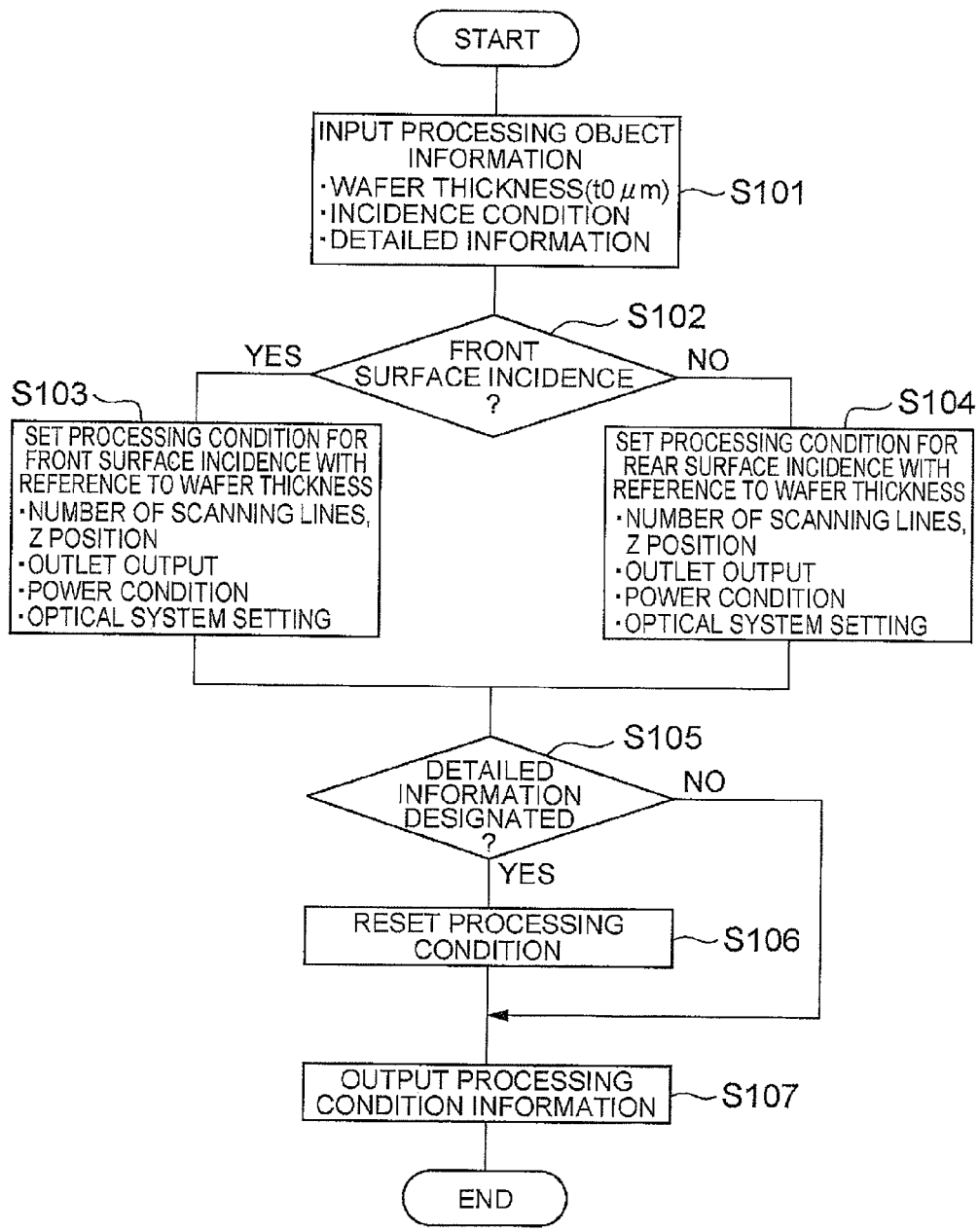
FIG. 7 is a flowchart showing one example of a method for setting a processing condition.
Figure 8:
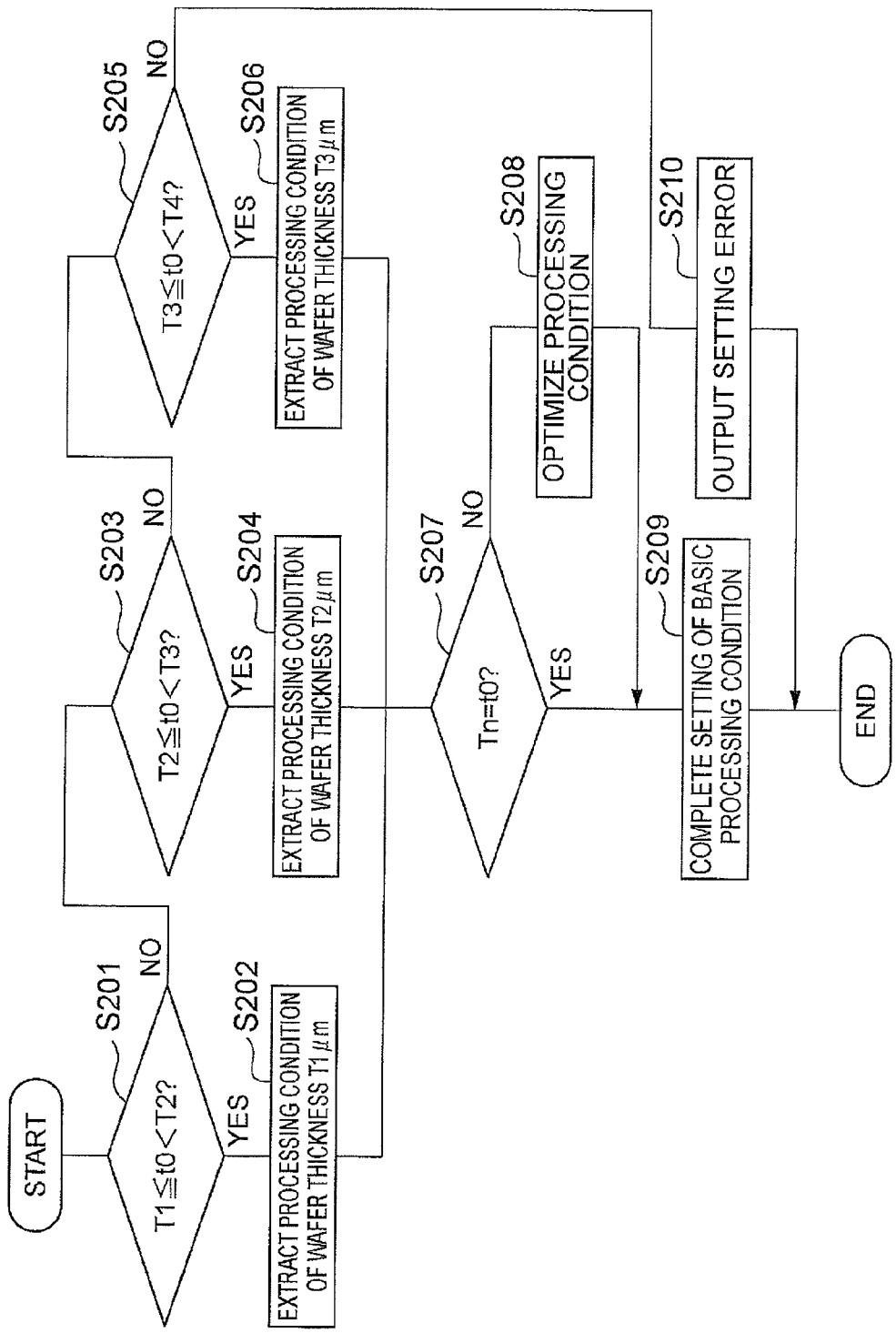
FIG. 8 is a flowchart showing one example of a method for setting a basic processing condition.
Figure 9:
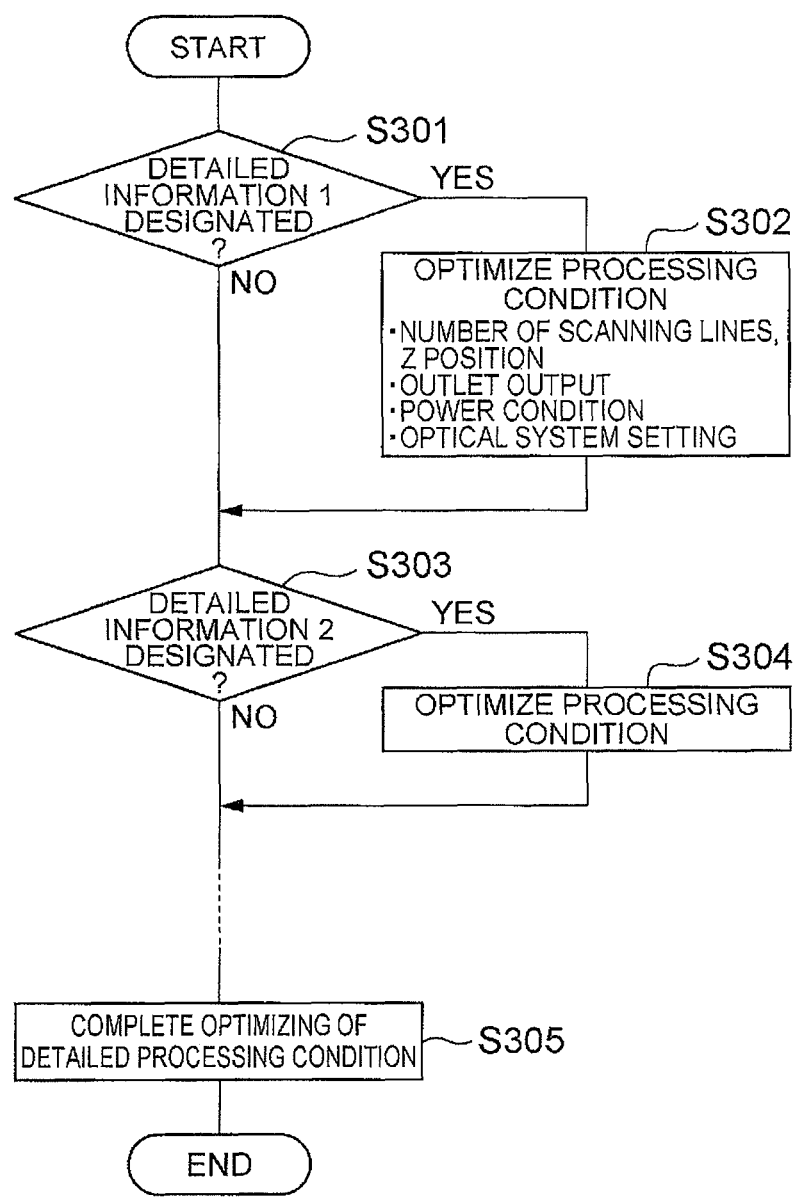
FIG. 9 is a flowchart showing one example of a method for setting a detailed processing condition.

Next, a description is given of a specific method for supplying information, which is carried out in the processing information supply apparatus 10 shown in FIG. 1. FIG. 7 to FIG. 9 are flowcharts showing one example of a method for setting a processing condition, which is carried out in the processing information supply apparatus 10. Hereinafter, a description is given mainly of an example in which an object to be processed that becomes a target subjected to cutting process by a laser processing apparatus is a semiconductor wafer.

In the example of setting a processing condition shown in FIG. 7, first, the processing object information for a semiconductor wafer, which is the object to be processed, is input via the information acquiring apparatus 31 and the object information input unit 12 of the information supply apparatus 10 by a user (refer to FIG. 1) of the laser processing apparatus 32 (step S101). Specifically, with respect to the semiconductor wafer, a wafer thickness (t0 μm) being a thickness of the object and an incidence condition of the laser light to the semiconductor wafer are input as requisite processing object information. In addition, detailed information on the semiconductor wafer is input as optional processing object information as necessary. Further, as the incidence condition of laser light, for example, either one of front surface incidence or rear surface incidence of the laser light for the semiconductor wafer of the object is designated.

For the processing object information, the processing condition setting unit 16 refers to the processing condition data included in the processing condition database 19, and sets the processing condition for the semiconductor wafer based on the input processing object information. First, the processing condition setting unit 16 refers to the wafer thickness t0 and the incidence condition of the laser light, which are the requisite information, extracts processing information from the processing condition database 19, and sets a basic processing condition in setting of the processing condition (S102 to S104). Further, where the detailed information being the optional information is input in addition to the requisite information, a detailed processing condition is set by optimizing the basic processing condition while referring to the detailed information as necessary, and the final processing condition is determined (S105 to S107).

Thus, as the processing object information for the object to be processed such as a semiconductor wafer, the thickness of the object and the incidence condition of the laser light to the object are input as the requisite information, and in addition, the detailed information for the object is input as the optional information as necessary, and the processing condition is set in the procedure responsive to the input processing information in the processing condition setting unit 16, wherein it is possible, in the processing information supply apparatus 10, to reliably acquire information necessary to set the processing conditions and to reliably carry out setting of the processing conditions based on the acquired information.

In the example shown in FIG. 7, in detail, which one of front surface incidence or rear surface incidence is judged with respect to the incidence condition of laser light for the semiconductor wafer (S102). If the front surface incidence is designated as the incidence condition of laser light, the basic processing condition is set with reference to the wafer thickness t0 under the front surface incidence condition of laser light (S103). Also, if the rear surface incidence is designated as the incidence condition of laser light, the basic processing condition is set with reference to the wafer thickness t0 under the rear surface incidence condition of laser light (S104).

As the basic processing condition is set based on the requisite processing object information, next, it is checked whether or not the detailed information being the optional processing object information is designated (S105). Then, if the detailed information is designated, the processing condition is reset based on the detailed information, and the detailed processing condition that becomes the final processing condition is set (S106). Further, unless the detailed information is set, the basic processing condition is determined to be the final processing condition as it is. The final processing condition set in the processing condition setting unit 16 based on the above-described procedure is output from the condition information output unit 13 to the processing information acquiring apparatus 31 as the processing condition information (S107).

Here, as the processing condition for laser processing, which is set in the processing condition setting unit 16, in detail, for example, it is preferable to set the number of scanning lines (refer to FIG. 3, the number of scanning lines is 1 in FIG. 3(*a*), and the number of scanning lines is 3 in FIG. 3(*b*)) showing the number of times of forming a cutting starting point region, in which modified regions are continuously or intermittently formed, by scanning the light-converging point along the line to cut for a semiconductor wafer being an object, and the irradiation condition of laser light for the semiconductor wafer in respective scanning lines. It is thereby possible to favorably set the processing condition to be applied in the laser processing apparatus.

In addition, in the example shown in FIG. 7, in detail, the position (Z position) in the thickness direction of the light-converging point in the semiconductor wafer being an object to be processed, the intensity condition of laser light for irradiating the semiconductor wafer, and the setting condition (optical system setting) of an optical system to irradiate the semiconductor wafer with laser light are set as the irradiation conditions of laser light in respective scanning lines. Also, with respect to the intensity condition of laser light, in further detail, the outlet output and power condition are set.

Of these processing conditions, the "outlet output" is a condition for output of laser light emitted from a processing objective lens 142 (refer to FIG. 5) onto the object to be processed S. Such laser light output is set, for example, by adjusting the optical attenuator 123 in the configuration of FIG. 5. That is, the "outlet output" can be said to be a kind of optical system setting.

In addition, the "power condition" is a condition for the laser light source etc. for supplying laser light for processing. In detail, laser output emitted from a laser oscillator, repetition frequency in the case of using pulse laser light, processing speed such as movement speed (relative movement speed of laser light for the object S) of the stage 102 in the case of irradiation of laser light, pulse width of laser light, and beam profile, etc., are set as the power conditions. Also, of these power conditions, the laser output and the repetition frequency are requisite setting items.

Further, the "optical system setting" is a condition with respect to setting of respective optical systems in the optical system main part 104, etc. In detail, the beam diameter of laser light incident into the objective lens 142, the beam divergence angle, and the beam profile, etc., are set as the optical system setting. Here, the beam diameter and the divergence angle of the laser light are requisite setting items, and for example, in the configuration shown in FIG. 5, the conditions are set by adjusting the laser shaping optical system such as the beam expander 122. Also, the beam profile of laser light corresponds to the beam shape of laser light for irradiating the object S, and for example, in the configuration shown in FIG. 6, the beam profile is set by adjusting the slit 223 formed by a pair of knife edges 224.

Still further, where cutting process is carried out by which a semiconductor wafer is cut in the form of a lattice and is made into a plurality of semiconductor elements, as described above, it is preferable that processing phases for forming cutting starting point regions in the X-axis direction and the Y-axis direction, respectively, with processing phases separated are set with respect to respective scanning lines as the processing conditions in addition to the above-described processing conditions.

FIG. 8 is a flowchart showing one example of a method for setting the basic processing condition in the case of the front surface incidence carried out in step S103 in FIG. 7. In the example of the setting method described below, such a setting method is used, by which the thickness of the object to be processed is input as the processing object information in the object information input unit 12, and in addition, a plurality of thickness ranges, which become the reference in regard to the thickness of the object, are prepared in the processing condition setting unit 16, and in setting of the processing condition, the processing condition of a thickness range corresponding to the input thickness of the object of the plurality of thickness ranges is extracted from the processing condition database 19 and the processing condition corresponding to the object is set based on the extracted processing condition. With such a method, it is possible to favorably set the processing condition to be applied in the laser processing apparatus.

In detail, in the setting method shown in FIG. 8, a plurality of thickness ranges are prepared by preparing values T1 to T4 (here, T1<T2<T3<T4) that become the references for the wafer thickness, and the methods for setting the processing condition are adopted case by case based on the value of wafer thickness t0 of a semiconductor wafer that becomes an object.

In the example shown in FIG. 8, first, it is judged in regard to the wafer thickness t0 whether or not it is in the range of T1≦t0<T2 (step S201). Then, if the designated wafer thickness t0 μm is in the range, the representative value of the wafer thickness in the range is made into T1 μm, and the processing condition in the case of wafer thickness T1 μm is extracted from the processing condition database 19 (S202).

If the wafer thickness t0 is not in the range of T1≦t0<T2, subsequently, it is judged whether or not the wafer thickness t0 is in the range of T2≦t0<T3 (S203). Then, if the designated wafer thickness t0 μm is in the range, the processing condition in the case of wafer thickness T2 μm is extracted from the processing condition database 19 (S204).

Further, if the wafer thickness t0 is not in the range of T2≦t0<T3, subsequently, it is judged whether or not the wafer thickness t0 is in the range of T3≦t0<T4 (S205). Then, if the designated wafer thickness t0 μm is in the range, the processing condition in the case of wafer thickness T3 μm is extracted from the processing condition database 19 (S206). Also, if the wafer thickness t0 is not in the range of T3≦t0<T4, that is, if the wafer thickness t0 is not in the range of T1≦t0<T4 (where the input thickness of the object is not in the range of a plurality of thickness ranges prepared), the processing condition for the designated processing object information is not settable, wherein a setting error is output (S210).

After the processing condition in the case of wafer thickness T1, T2 or T3 is extracted from the processing condition database 19 (S202, S204, S206), subsequently, it is judged whether or not the designated wafer thickness t0 agrees with the thickness Tn (n=1, 2, 3), which is made into the representative value in the respective range (Tn=t0) (S207). Then, if Tn agrees with t0, the extracted processing condition is determined to be the basic processing condition as it is, and the setting of the basic processing condition is completed (S209). Also, unless Tn agrees with t0, the extracted processing condition is optimized corresponding to a difference between Tn and t0 (S208), and the basic processing condition is set (S209).

Here, with respect to setting of the basic processing condition in the case of the rear surface incidence carried out in step S104 in FIG. 7, basically the same setting method as in the case of the front surface incidence shown in FIG. 8 is used. However, in regard to the specific setting conditions of wafer thickness values T1 to T4, etc., in order to use the setting methods case by case based on the wafer thickness t0 in setting of the processing condition, different conditions may be adopted in the respective cases of front surface incidence and rear surface incidence.

FIG. 9 is a flowchart showing one example of a method for setting the detailed processing condition carried out in step S106 in FIG. 7. In the setting method, it is assumed that a plurality of information items such as detailed information 1, 2, . . . are prepared as the detailed information for the object to be processed. However, with respect to such detailed information, such a configuration may be accepted, in which a single information item is prepared.

In the example shown in FIG. 9, first, it is judged whether or not the detailed information 1 is designated (step S301). Then, if the detailed information 1 is designated, an optimizing process is carried out for the processing condition set based on the requisite information (S302). Subsequently, it is judged whether or not the next detailed information 2 is designated (S303). Then, if the detailed information 2 is designated, an optimizing process is carried out for the processing condition (S304). If such checking of designation of the detailed information and the optimizing process where designated are executed for all the detailed information items, the detailed processing condition being the final processing condition is set (S305).

Figure 10:
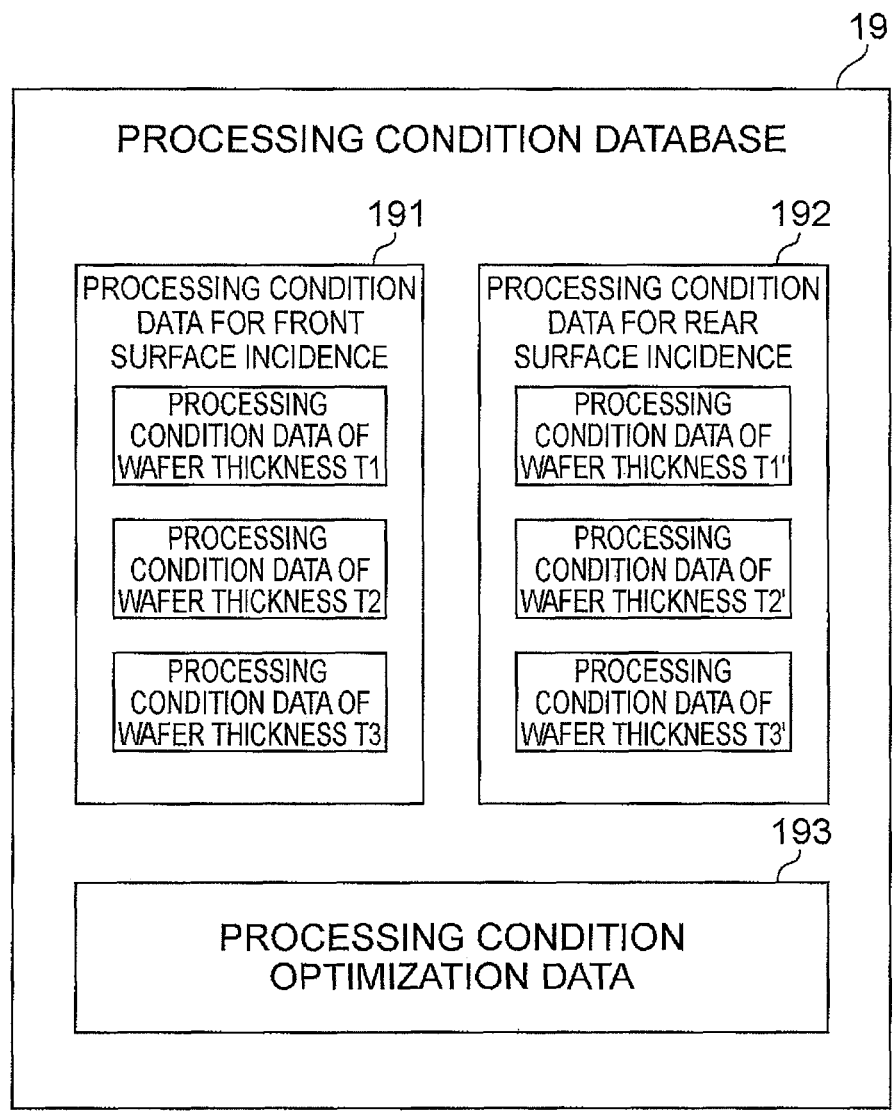
FIG. 10 is a schematic view showing one example of data configuration of a processing condition database.

FIG. 10 is a view showing one example of data configuration in the processing condition database 19. In FIG. 10, one example of processing condition data prepared in the processing condition database 19 in the case where the method for setting the processing condition shown in FIG. 7 to FIG. 9 is used is schematically shown. In the configuration example, processing condition data 191 in the case of front surface incidence, which includes the processing condition data for each of the wafer thickness T1, T2, T3 being the reference values of wafer thickness, and processing condition data 192 in the case of rear surface incidence, which includes the processing condition data for each of the wafer thickness T1', T2', T3' as well, are prepared in the processing condition database 19.

In addition, in the configuration example, processing condition optimization data 193 is prepared in addition to the processing condition data 191, 192. The optimization data 193 includes optimization data (refer to FIG. 8) used where Tn=t0 is not established in the setting of the basic processing condition, and optimization data (refer to FIG. 9) used where the detailed information is designated in the setting of the detailed processing condition. As shown in the example, it is preferable that the processing condition database 19 is configured to be corresponding to the contents of the processing object information input from the object information input unit 12 and the specific method for setting the processing condition, which is executed in the processing condition setting unit 16.

A further description is given of a method for supplying information in the processing information supply apparatus 10 shown in FIG. 1. FIG. 11 is a view showing one example of an input screen used for inputting the processing object information into the processing information supply apparatus 10. The input screen 50 is, for example, displayed in the display unit of the processing information acquiring apparatus 31 operated by a user in the configuration shown in FIG. 1.

The input screen 50 shown in FIG. 11 is provided with a work name input part 51 in which a processing work name is input, a wafer thickness input part 52 in which the wafer thickness being the requisite information is input, an incidence condition input part 53 for selecting the incidence condition of laser light from the rear surface incidence and the front surface incidence, and a detailed information input part 54 for inputting the detailed information. Further, in the configuration example, an expanding method input part 55 is further provided, in which information regarding a method for cutting an object to be processed after having formed modified regions is input. Also, a processing condition setting button 56 for instructing execution of setting of the processing condition based on the input processing object information and a clear button 57 for clearing the input processing object information are provided downward of the input parts 51 to 55.

In the detailed information input part 54, specifically, it is able to designate the detailed information for the respective items of wafer type, wafer size, chip size, street width, crystal orientation/processing angle, dope type/rate, street state, and rear surface state.

As an example of the above-described detailed information, there are MPU, DSP, DRAM, SRAM, flash memory, optical device, MEMS, bare wafer, etc., in detail as the wafer types. Also, there are <100>, <111>, <110>, etc., as the crystal orientations. Also, there are Sb(n type), As(n type), P(n type), B(p type), etc., as the dope types.

Also, with respect to the street state, there are $SiO_2$, $SiO_2$+SiN, Poly-Si, Bear-Si, etc., as the street state 1. Further, there are AlN film contained, Low-k film contained, SOI contained, through electrode provided, stain due to etching, etc., as the street state 2. With respect to the rear surface state, there are Bear-Si, $SiO_2$, $SiO_2$+SiN, Poly-Si, rear surface electrode (Au), rear surface electrode (AuSn), etc., as the rear surface state 1. Further, there are polyimide/resin-based film, metallic film, through electrode provided, bump provided, DAF attached after being processed, DAF attached before processing, stain due to etching, etc., as the rear surface state 2.

FIG. 11 shows an example in which, as an input example of the processing object information, processing work name=work 1, wafer thickness t0=230 μm, incidence condition=front surface incidence, detailed information=designated, are input, and as the detailed information, the information of the dope type=Sb(n type) and dope rate=0.5 Ω·cm is input.

Figure 12:
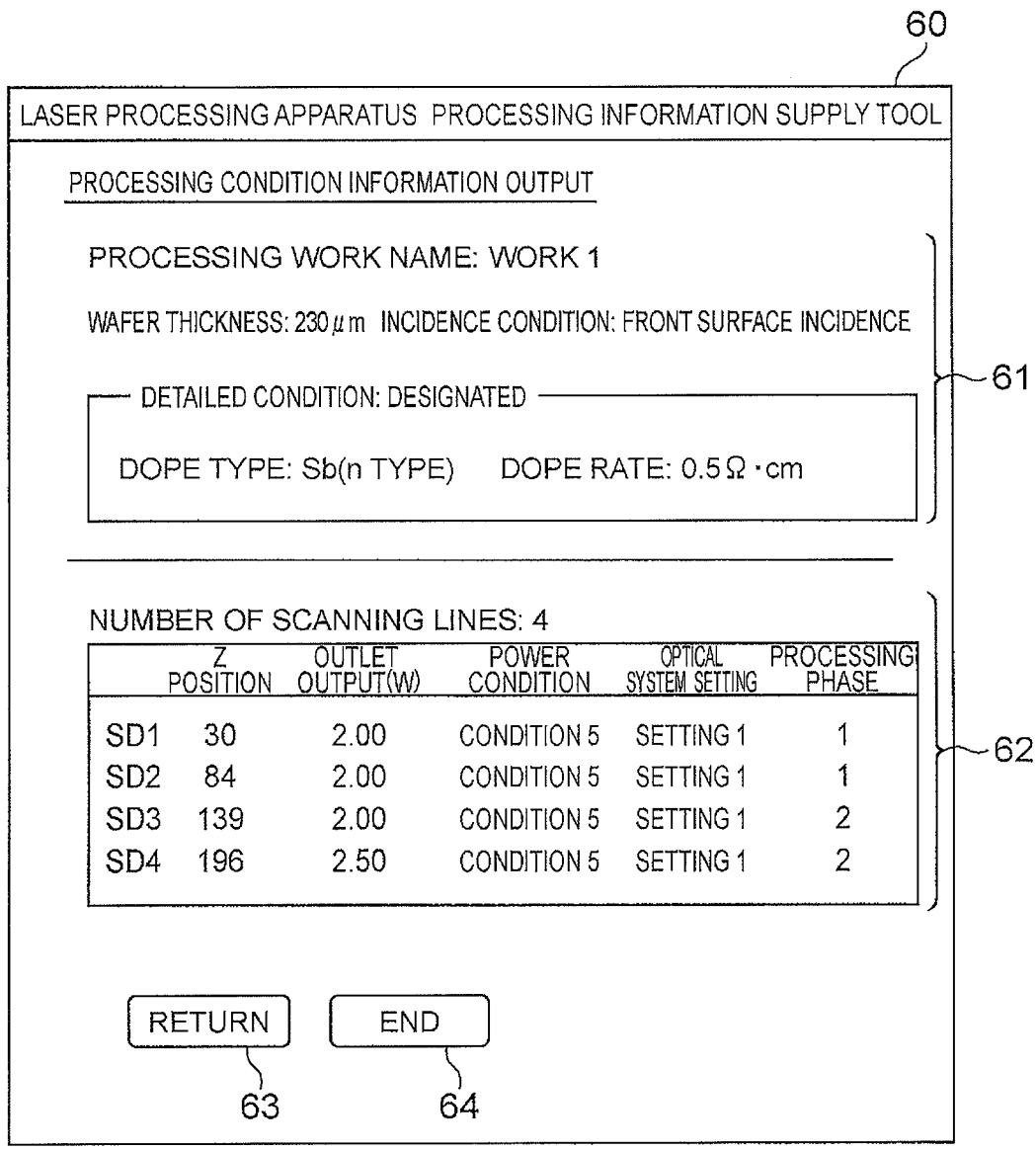
FIG. 12 is a view showing one example of an output screen used for outputting processing condition information.

FIG. 12 is a view showing one example of an output screen used to output processing condition information from the processing information supply apparatus 10. The output screen 60 is displayed on the display unit of the processing information acquiring apparatus 31 operated by a user, for example, in the configuration shown in FIG. 1, as with the input screen 50 in FIG. 11.

The output screen 60 shown in FIG. 12 is provided with a processing object information display part 61 for displaying the processing object information input in the input screen 50 and a processing condition information display part 62 for showing the processing conditions set based on the processing object information. Also, a return button 63 for returning to the input screen 50 and an end button 64 for ending a setting process of the processing conditions are provided downward of these display parts 61 and 62.

FIG. 12 shows an example in which specific processing conditions to be applied to a laser processing apparatus are displayed for each of four scanning lines SD1, SD2, SD3 and SD4 when the number of scanning lines are set to four, as an output example of the processing condition information set corresponding to the processing object information described above with respect to FIG. 11.

In detail, in regard to the first scanning line SD1, Z position=30 μm, outlet output=2.00 W, and processing phase=1 are output. Also, in regard to the second scanning line SD2, Z position=84 μm, outlet output=2.00 W, and processing phase=1 are output. Also, in regard to the third scanning line SD3, Z position=139 μm, outlet output=2.00 W, and processing phase=2 are output. Also, in regard to the fourth scanning line SD4, Z position=196 μm, outlet output=2.50 W, and processing phase=2 are output. In addition, with respect to the power condition and the optical system setting, condition 5 and setting 1 are output for all of the scanning lines SD1 to SD4.

Further, in the above-described example in which the processing phase=1 is set in the scanning lines SD1 and SD2 and the processing phase=2 is set in the scanning lines SD3 and SD4, laser processing of a semiconductor wafer for cutting in the X-axis direction and the Y-axis direction in the form of a lattice is carried out in the procedure described below. First, in the processing phase 1, the scanning lines SD1 and SD2 are executed in the X-axis direction in order, and two modified region rows are formed, and subsequently, the scanning lines SD1 and SD2 are executed in the Y-axis direction in order, and two modified region rows are formed as well. Further, in the processing phase 2, the scanning lines SD3 and SD4 are executed in the Y-axis direction (or the X-axis direction) in order, and two modified region rows are formed, and subsequently, the scanning lines SD3 and SD4 are executed in the X-axis direction (or the Y-axis direction) in order, and two modified region rows are formed as well. Such setting of the processing phases is effective in terms of favorably forming the modified region rows in the respective scanning lines.

It is preferable that the processing conditions in the laser processing apparatus 32, which are set in the processing condition setting unit 16 of the processing information supply apparatus 10 and output from the condition information output unit 13, are set and output so as to correspond to the setting items, which can be operated and set in the object laser processing apparatus 32, and the parameters which can be set and selected in the respective setting items.

Further, it is preferable that the laser processing apparatus 32 is provided with a setting operation unit which is capable of setting the processing conditions based on the information supplied from the processing information supply apparatus 10. With respect to such a setting operation unit, for example, such a configuration may be used which displays a setting operation screen on the display unit provided in the laser processing apparatus 32. Alternatively, such a configuration may be used, in which a setting operation panel including a condition setting button and a setting knob is provided in the laser processing apparatus 32.

Figure 13:
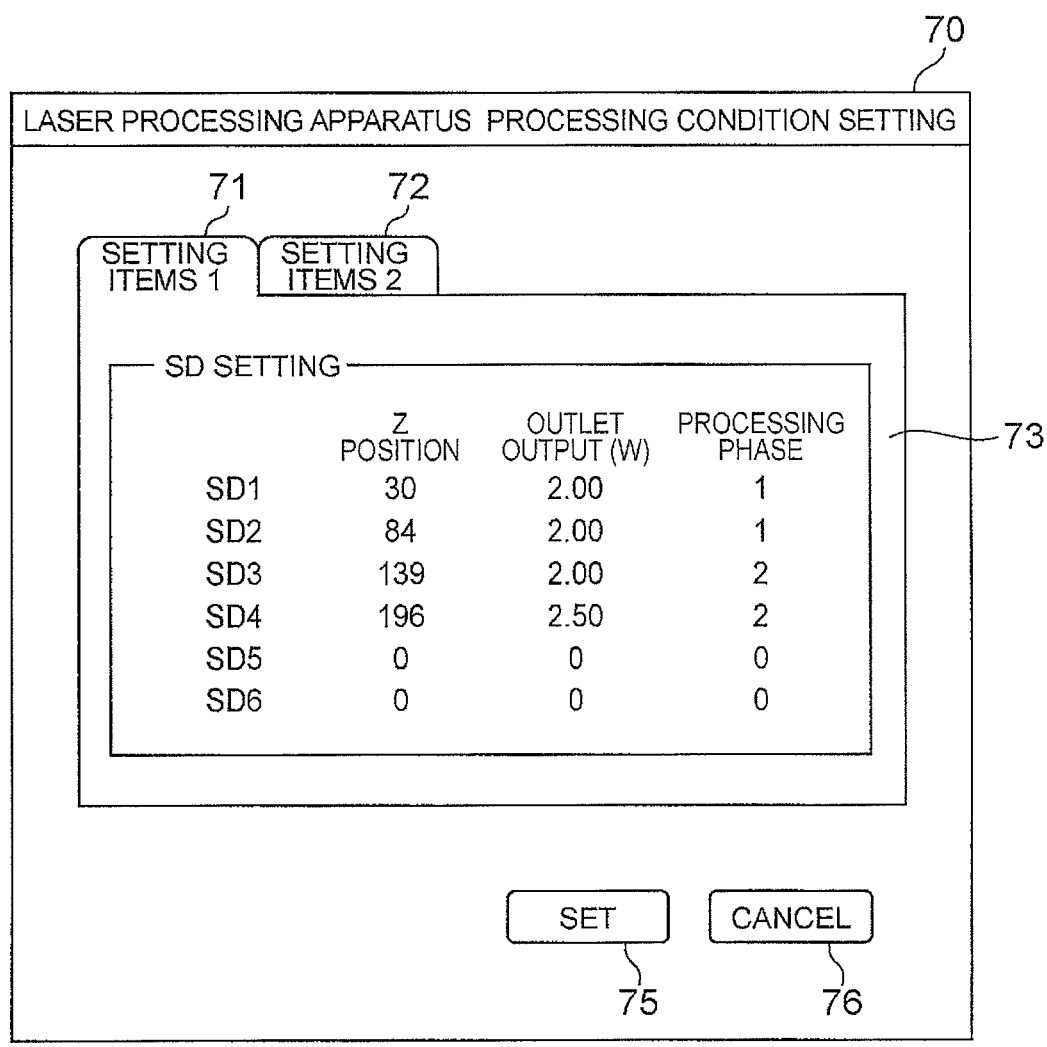
FIG. 13 is a view showing one example of an operation screen used for setting operations of processing conditions.
Figure 14:
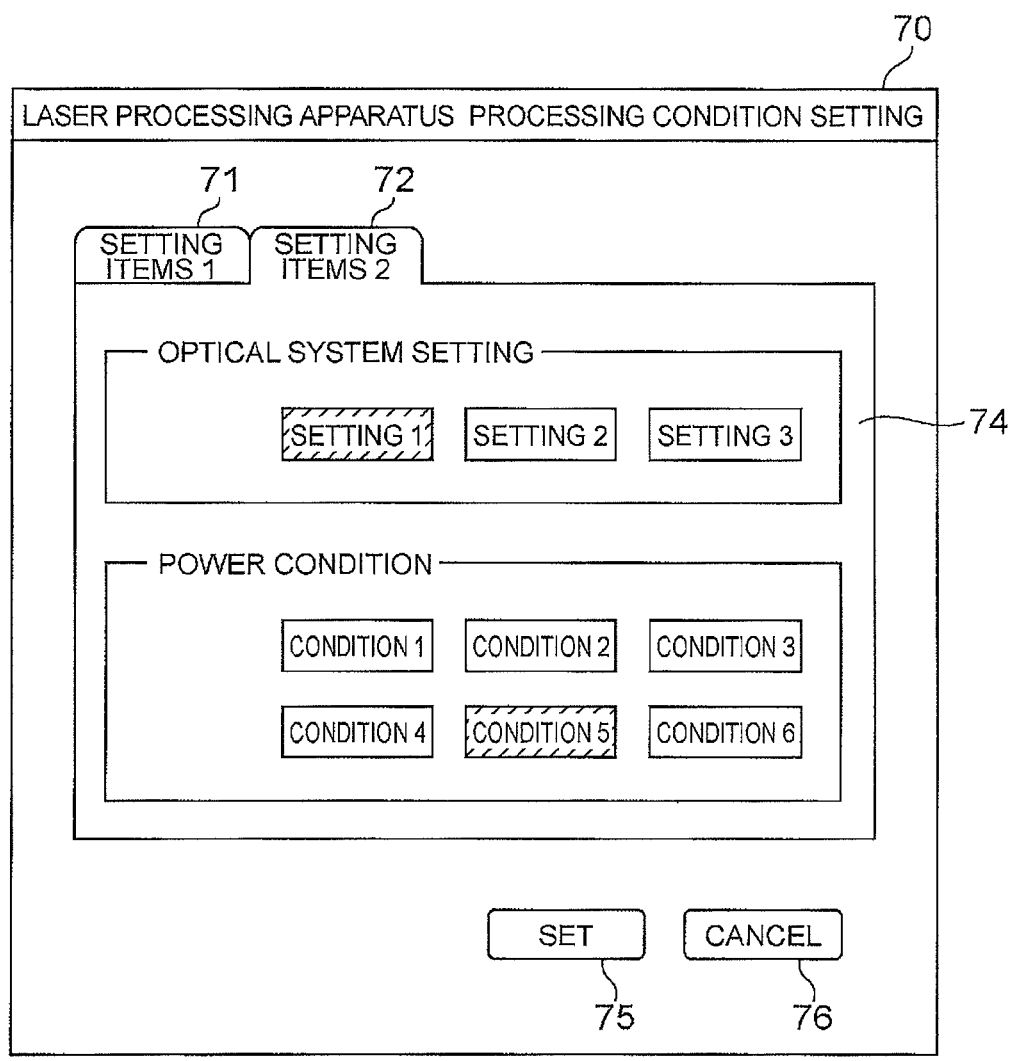
FIG. 14 is a view showing one example of an operation screen used for setting operations of processing conditions.

FIG. 13 and FIG. 14 are views showing one example of an operation screen used for setting operation of the processing conditions in a laser processing apparatus. In the operation screen 70, the setting item display part displayed on the operation screen 70 can be changed over by the first setting item tag 71 and the second setting item tag 72. In addition, a set button 75 to complete a setting operation of processing conditions and a cancel button 76 to cancel the setting contents are provided downward of these item tags 71 and 72 and the setting item display part.

In FIG. 13, the first setting item tag 71 is selected, and the first setting item display part 73 corresponding thereto is displayed on the operation screen 70. Here, the Z position, outlet output, and processing phases are set in regard to the four scanning lines SD1, SD2, SD3 and SD4 shown in FIG. 12, and the contents thereof are displayed. Further, in FIG. 14, the second setting item tag 72 is selected, and the second setting item display part 74 corresponding thereto is displayed on the operation screen 70. Here, selectable contents and the selected processing conditions (shown by hatching) are displayed with respect to each of the optical system setting and power condition.

The processing information supply apparatus and the processing information supply system according to the present invention are not limited to the above-described embodiment and configuration examples, and may be subjected to various modifications. For example, with respect to the contents of the processing object information input in the processing information supply apparatus 10, the contents of processing condition information set and output by the processing information supply apparatus 10, the method for setting processing conditions, and the data configuration in the processing condition database, etc., only the examples thereof are shown in FIG. 7 to FIG. 14, wherein various configurations may be specifically used.

The processing information supply apparatus according to the above-described embodiment is an apparatus for supplying processing information applied to a laser processing apparatus for forming a modified region, which becomes a starting point of cutting, within an object to be processed along a line to cut the object by irradiating the object with laser light while locating a light-converging point within the object, and the processing information supply apparatus includes (1) object information input means for inputting processing object information on the object to be processed, (2) a processing condition database in which data on processing conditions to form the modified region within the object to be processed by irradiating the object with laser light, corresponding to the processing object information in the laser processing apparatus, is accumulated, (3) processing condition setting means for referring to the processing condition data included in the processing condition database and setting a processing condition for the object to be processed based on the processing object information input from the object information input means, and (4) condition information output means for outputting processing condition information for the processing condition set by the processing condition setting means.

Here, in the processing information supply apparatus described above, it is preferable that the object information input means and the condition information output means are configured so as to be connectable to a processing information acquiring apparatus for acquiring the processing information applied to the laser processing apparatus via a network.

Also, the processing information supply system according to the above-described embodiment is provided with the processing information supply apparatus having the above-described configuration and a processing information acquiring apparatus connected to the processing information supply apparatus via a network, which acquires the processing information applied to the laser processing apparatus, wherein the processing information acquiring apparatus is configured so as to provide the processing object information to the processing information supply apparatus via the object information input means and acquire the processing condition information via the condition information output means.

In addition, it is preferable that the processing information supply apparatus is provided with setting history storing means for storing a setting history including at least one of the processing object information and the processing condition information with respect to setting of the processing condition executed in the processing condition setting means. In this configuration, at the processing information supply apparatus side, it becomes possible to favorably recognize the state of utilization of the information supply apparatus by a user of a laser processing apparatus or to recognize the contents of processing information required at the user side.

In addition, with respect to the specific processing object information input in the supply apparatus, it is preferable that the object information input means allows input, as the processing object information, of the thickness of the object to be processed and the incidence condition of the laser light onto the object as requisite information, and, as necessary, allows input of the detailed information for the object as optional information.

In this configuration, it is possible to reliably acquire information necessary to set the processing condition for the laser processing apparatus in the processing information supply apparatus. Also, in this case, it is preferable that the processing condition setting means, in setting of the processing condition, refers to the thickness of the object and the incidence condition of laser light, extracts the processing condition from the processing condition database, and sets the basic processing condition, and, as necessary, sets the detailed processing condition by optimizing the processing condition with reference to the detailed information.

In addition, it is preferable that the object information input means allows input of the thickness of the object as the processing object information, and the processing condition setting means prepares a plurality of thickness ranges that become the reference in regard to the thickness of the object, and in setting of the processing condition, the processing condition setting means extracts the processing condition of the thickness range corresponding to the input thickness of the object of the plurality of thickness ranges from the processing condition database and sets the processing condition with respect to the object based on the extracted processing condition.

In this configuration, it is possible to favorably set the processing conditions to be applied to a laser processing apparatus. Also, in this case, the processing condition setting means may output a setting error as the processing condition being unsettable with respect to the input processing object information where the input thickness of the object is not within the plurality of thickness ranges prepared.

Further, with respect to the processing condition of laser processing, which are set in the supply apparatus, it is preferable that the processing condition setting means sets, as the processing condition, the number of scanning lines showing the number of times of forming a cutting starting point region, in which modified regions are continuously or intermittently formed, by scanning the light-converging point along the line to cut with respect to the object to be processed, and the irradiation condition of laser light in respective scanning lines. It is thereby possible to favorably set the processing condition to be applied to a laser processing apparatus.

Still further, in regard to the irradiation condition of laser light in respective scanning lines in this case, it is preferable that the processing condition setting means sets, as the irradiation condition of the laser light, the position in the thickness direction of the light-converging point in the object, the intensity condition of laser light for irradiating the object, and the setting condition of an optical system for irradiating the object with laser light.

INDUSTRIAL APPLICABILITY

The present invention can be utilized as a processing information supply apparatus and a processing information supply system, which are capable of favorably acquiring processing information applied to a laser processing apparatus at a processing worker side.

The invention claimed is:

1. A processing information supply apparatus for supplying processing information applied to a laser processing apparatus for forming a modified region, which becomes a starting point of cutting, within an object to be processed along a line to cut the object by irradiating the object with laser light while locating a light-converging point within the object, the processing information supply apparatus comprising:
   object information input means for inputting processing object information on the object to be processed;
   a processing condition database in which data on processing conditions to form the modified region within the object to be processed by irradiating the object with the laser light, corresponding to the processing object information in the laser processing apparatus, is accumulated;
   processing condition setting means for referring to the processing condition data included in the processing condition database and setting a processing condition for the object to be processed based on the processing object information input from the object information input means; and
   condition information output means for outputting processing condition information for the processing condition set by the processing condition setting means.

2. The processing information supply apparatus according to claim 1, wherein the object information input means and the condition information output means are configured so as to be connectable to a processing information acquiring apparatus for acquiring the processing information applied to the laser processing apparatus via a network.

3. The processing information supply apparatus according to claim 1, further comprising setting history storing means for storing a setting history including at least one of the processing object information and the processing condition information with respect to setting of the processing condition, which is carried out by the processing condition setting means.

4. The processing information supply apparatus according to claim 1, wherein the object information input means allows input, as the processing object information, of a thickness of the object to be processed and an incidence condition of the laser light onto the object as requisite information, and, as necessary, allows input of detailed information for the object as optional information.

5. The processing information supply apparatus according to claim 4, wherein the processing condition setting means, in setting of the processing condition, refers to the thickness of the object and the incidence condition of the laser light, extracts a processing condition from the processing condition database, sets a basic processing condition, and, as necessary, sets a detailed processing condition by optimizing the processing condition with reference to the detailed information.

6. The processing information supply apparatus according to claim 1, wherein the object information input means inputs a thickness of the object to be processed as the processing object information, and
   the processing condition setting means prepares a plurality of thickness ranges that become the reference in regard to the thickness of the object, and in setting of the processing condition, extracts the processing condition of the thickness range corresponding to the input thickness of the object of the plurality of thickness ranges from the processing condition database and sets the processing condition with respect to the object based on the extracted processing condition.

7. The processing information supply apparatus according to claim 6, wherein the processing condition setting means outputs a setting error as the processing condition being unsettable with respect to the input processing object information where the input thickness of the object is not within the plurality of thickness ranges prepared.

8. The processing information supply apparatus according to claim 1, wherein the processing condition setting means sets, as the processing condition, the number of scanning lines showing the number of times of forming a cutting starting point region, in which modified regions are continuously or intermittently formed, by scanning the light-converging point along the line to cut with respect to the object to be processed, and the irradiation condition of the laser light in respective scanning lines.

9. The processing information supply apparatus according to claim 8, wherein the processing condition setting means sets, as the irradiation condition of the laser light, the position in the thickness direction of the light-converging point in the object to be processed, the intensity condition of the laser light for irradiating the object, and the setting condition of an optical system for irradiating the object with the laser light.

10. A processing information supply system comprising:
processing information supply apparatus according to claim 1; and
a processing information acquiring apparatus connected to the processing information supply apparatus via a network, which acquires the processing information applied to the laser processing apparatus;
wherein the processing information acquiring apparatus provides the processing object information to the processing information supply apparatus via the object information input means, and acquires the processing condition information via the condition information output means.

11. A processing information supply apparatus for supplying processing information applied to a laser processing apparatus for forming a modified region, which becomes a starting point of cutting, within an object to be processed along a line to cut the object by irradiating the object with laser light while locating a light-converging point within the object, the processing information supply apparatus comprising:
object information input means for inputting processing object information on the object to be processed;
a processing condition database in which data on processing conditions to form the modified region within the object to be processed by irradiating the object with the laser light, corresponding to the processing object information in the laser processing apparatus, is accumulated;
processing condition setting means for referring to the processing condition data included in the processing condition database and setting a processing condition for the object to be processed based on the processing object information input from the object information input means; and
condition information output means for outputting processing condition information for the processing condition set by the processing condition setting means, wherein
the object information input means allows input, as the processing object information, of a thickness of the object to be processed and an incidence condition of the laser light onto the object as requisite information, allows designation, as the incidence condition of the laser light, of either one of front surface incidence or rear surface incidence of the laser light for the object, and, as necessary, allows input of detailed information for the object as optional information, and
the processing condition setting means, in setting of the processing condition, judges which one of the front surface incidence or the rear surface incidence with respect to the incidence condition of the laser light,
if the front surface incidence is designated, extracts a processing condition from the processing condition database and sets a basic processing condition with reference to the thickness of the object under the front surface incidence condition of the laser light,
if the rear surface incidence is designated, extracts a processing condition from the processing condition database and sets a basic processing condition with reference to the thickness of the object under the rear surface incidence condition of the laser light, and,
as necessary, sets a detailed processing condition by optimizing the processing condition with reference to the detailed information.

12. The processing information supply apparatus according to claim 11, wherein the object information input means and the condition information output means are configured so as to be connectable to a processing information acquiring apparatus for acquiring the processing information applied to the laser processing apparatus via a network.

13. The processing information supply apparatus according to claim 11, further comprising setting history storing means for storing a setting history including at least one of the processing object information and the processing condition information with respect to setting of the processing condition, which is carried out by the processing condition setting means.

14. The processing information supply apparatus according to claim 11, wherein the processing condition setting means prepares a plurality of thickness ranges that become the reference in regard to the thickness of the object, and
in setting of the basic processing condition with reference to the thickness of the object, judges the thickness range corresponding to the input thickness of the object of the plurality of thickness ranges, extracts the processing condition in the case of a representative value of the thickness of the object in the judged thickness range from the processing condition database, and judges whether or not the input thickness of the object agrees with the representative value,
if the representative value agrees with the input thickness, sets the extracted processing condition to be the basic processing condition as it is, and
if the representative value disagrees with the input thickness, optimizes the extracted processing condition based on a difference between the input thickness of the object and the representative value and sets the basic processing condition.

15. The processing information supply apparatus according to claim 14, wherein the processing condition setting means outputs a setting error as the processing condition being unsettable with respect to the input processing object information where the input thickness of the object is not within the plurality of thickness ranges prepared.

16. The processing information supply apparatus according to claim 11, wherein the processing condition setting means sets, as the processing condition, the number of scanning lines showing the number of times of forming a cutting starting point region, in which modified regions are continuously or intermittently formed, by scanning the light-converging point along the line to cut with respect to the object to be processed, and the irradiation condition of the laser light in respective scanning lines.

17. The processing information supply apparatus according to claim 16, wherein the processing condition setting means sets, as the irradiation condition of the laser light, the position in the thickness direction of the light-converging point in the object to be processed, the intensity condition of the laser light for irradiating the object, and the setting condition of an optical system for irradiating the object with the laser light.

18. A processing information supply system comprising:
processing information supply apparatus according to claim 11; and
a processing information acquiring apparatus connected to the processing information supply apparatus via a network, which acquires the processing information applied to the laser processing apparatus;
wherein the processing information acquiring apparatus provides the processing object information to the processing information supply apparatus via the object information input means, and acquires the processing condition information via the condition information output means.

* * * * *

UNITED STATES PATENT AND TRADEMARK OFFICE
CERTIFICATE OF CORRECTION

PATENT NO. : 8,436,273 B2 Page 1 of 1
APPLICATION NO. : 12/669230
DATED : May 7, 2013
INVENTOR(S) : Takeshi Sakamoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this
Eighth Day of September, 2015

Michelle K. Lee
*Director of the United States Patent and Trademark Office*